INVENTOR
WILLIAM L. WOODFILL
BY Andrus & Starke
ATTORNEYS

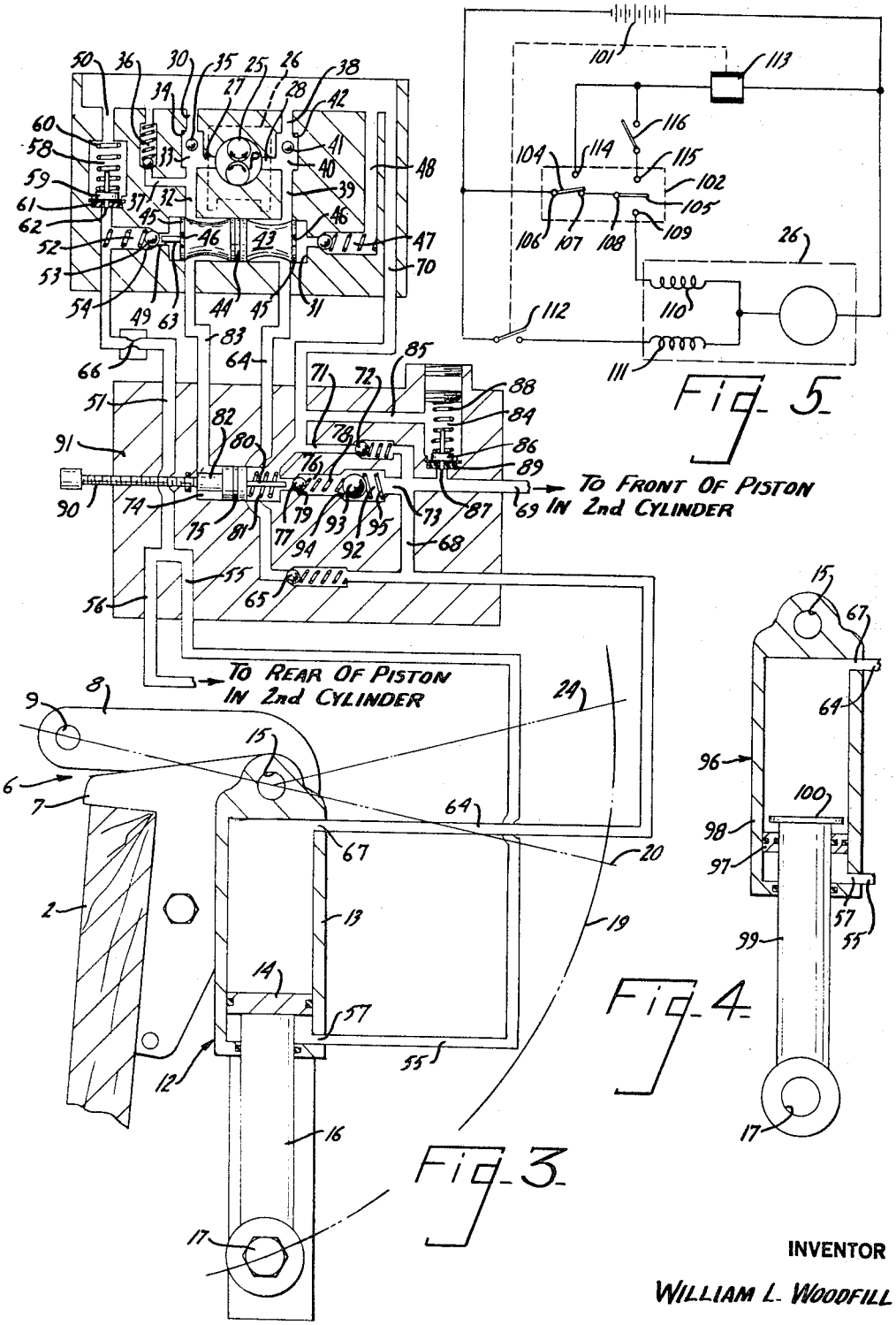

United States Patent Office 3,434,448
Patented Mar. 25, 1969

3,434,448
COMBINED IMPACT DAMPING AND POWER LIFT MECHANISM FOR AN OUTBOARD PROPULSION UNIT ASSEMBLY
William L. Woodfill, Oshkosh, Wis., assignor to Brunswick Corporation, Chicago, Ill., a corporation of Delaware
Filed Jan. 12, 1967, Ser. No. 608,903
Int. Cl. B63h 21/26; F15b 13/04
U.S. Cl. 115—41                    11 Claims

ABSTRACT OF THE DISCLOSURE

The hydraulic system includes a cylinder piston assembly which extends between adjacent members pivoted relative to each other and which bridges the tilt axis of the outboard propulsion unit. The system includes means for holding forward and reverse thrust of the unit and provides for power and manual lifting of the unit, power trimming of the unit even while underway, and damping of the angular momentum imparted to the drive member upon impact with a submerged or floating object.

---

Several forms of combined impact damping and power lift mechanisms for outboard propulsion units are shown and described in Patents Nos. 3,003,724 and 3,285,221 which are assigned to the common assignee with this invention. In the structures described in the foregoing patents generally complicated cylinder-piston assemblies were required and/or the mechanisms contemplated provision on the propulsion unit of a thrust receiving abutment and engaging releasable latch assembly beneath the tilt axis to establish and releasably secure the operating trim for the unit. It is generally an object of this invention to provide an improved hydraulic system capable of trimming the drive member even while underway, lifting the drive member, and damping of the momentum imparted to the drive member upon impact with a submerged object and which will utilize a simpler cylinder-piston assembly and eliminate the need for a thrust receiving abutment and releasable latch assembly on the propulsion unit.

According to the invention, cylinder-piston means are interposed between and connect the members of an outboard propulsion unit assembly joined for relative pivotal movement in a generally vertical plane at the transverse horizontal tilt axis of the unit assembly. The cylinder-piston means are substantially extended in the normal operating position of the unit assembly and contract within a given effective tilt range with relative pivotal movement of the connected members about the tilt axis. The cylinder-piston means form a part of a hydraulic system which is adapted to provide for power lifting, power trim adjustment and manual lifting of the drive unit of the propulsion unit assembly. The hydraulic system further provides for damping of the angular momentum of the drive unit upon impact with a submerged or floating object.

The drawings furnished herewith illustrate the best mode for carrying out the invention as presently contemplated and set forth hereinafter.

Figure 1:
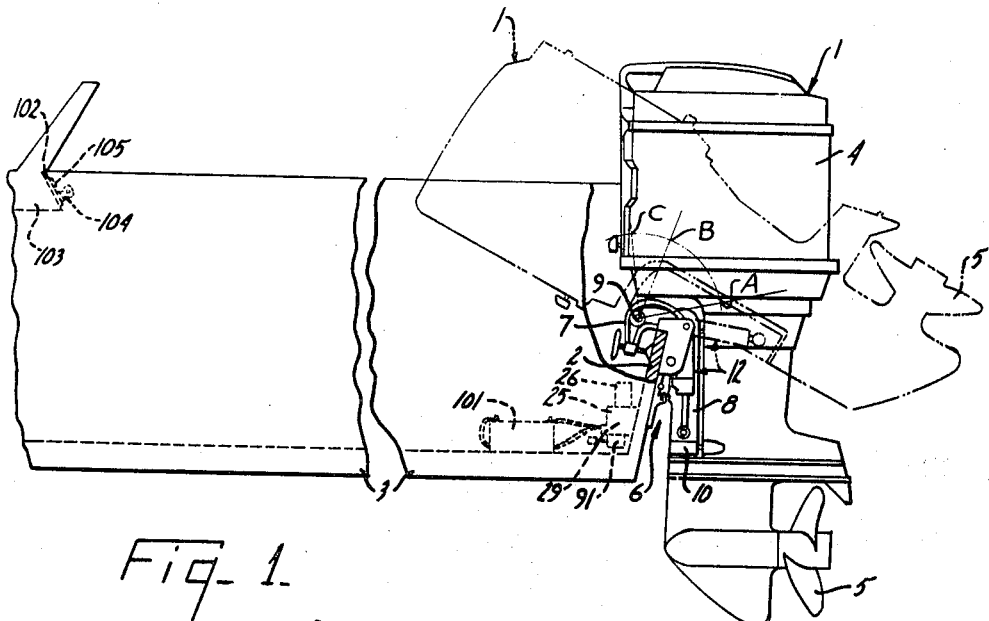
Figure 2:
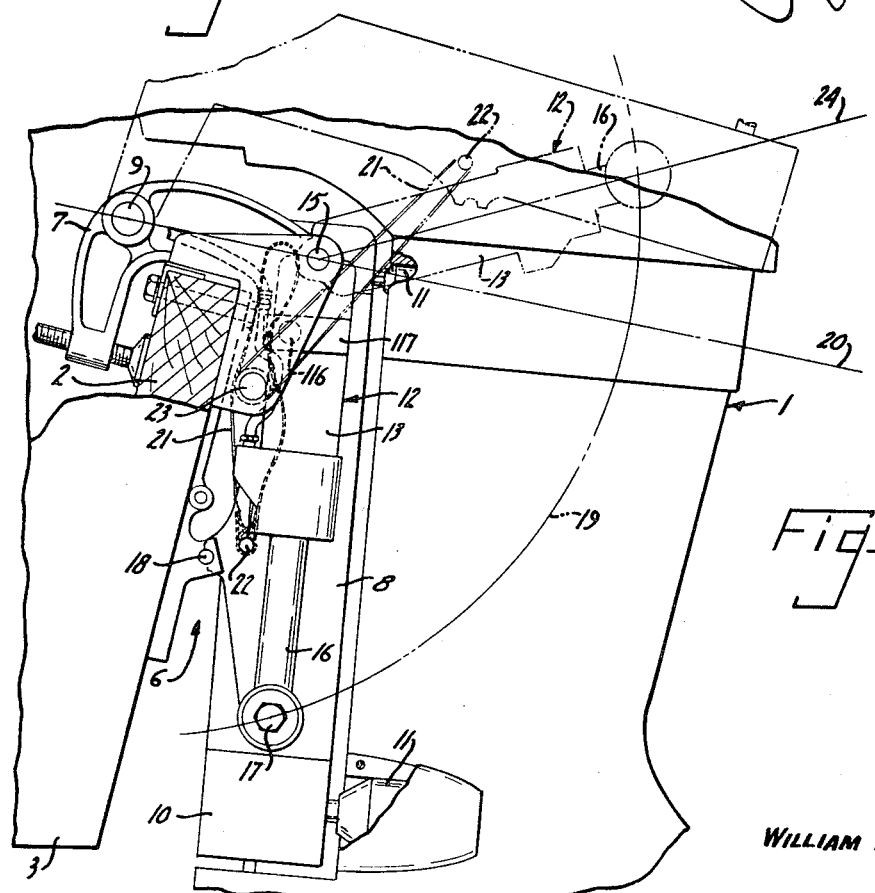

In the drawings:
FIGURE 1 is a side elevation of an outboard motor embodying the invention and shows the motor mounted on a partially shown watercraft in a given operating trim position and in phantom lines shows the motor unit in an elevated position corresponding generally to the maximum power tilt position;
FIG. 2 is an enlarged side elevation of a portion of an outboard motor showing certain details of the bracket assembly for supporting the drive or power unit;
FIG. 3 is a schematic view of the hydraulic system of the invention providing for impact damping, power trim adjustment and power lift for an outboard propulsion unit;
FIG. 4 is a sectional view showing an alternate cylinder-piston means as may be employed in the hydraulic system of FIG. 3; and
FIG. 5 is a schematic view of the electrical system for control of the hydraulic system shown in FIG. 3.

Referring to the drawings, an outboard propulsion unit assembly in the form of an outboard motor 1 is secured to the transom 2 of a partially shown watercraft 3. The outboard motor 1 includes the drive or power unit 4 having a propeller 5 and which is supported from the transom 2 by means of the bracket assembly 6.

The bracket assembly 6 of the motor 1 generally includes a transom bracket 7 which is secured to the transom 2 of watercraft 3 and an intermediate or swivel bracket 8 interposed between the bracket 7 and the power unit 4. In the motor 1 the swivel bracket 8 is pivotally supported from tre transom bracket 7 by a generally transverse horizontal tilt pin 9 to provide for movement of the power unit 4 in a generally vertical plane about the tilt axis. The swivel bracket 8 in turn pivotally supports the power unit 4 by a generally vertical swivel pin 10 to provide for movement of the power unit in a generally horizontal plane about the steering axis. Resilient mounts 11 are interposed between swivel pin 10 and the power unit 4 to provide for limited relative movement therebetween.

According to this invention, cylinder-piston means 12 form a part of a hydraulic system and are interposed and connected between the clamp bracket 7 or a bracket extension thereof and swivel bracket 8 to bridge the tilt axis. The cylinder-piston means 12 are adapted to damp the angular momentum imparted to the power unit 4 upon striking a submerged or floating object and to lift the power unit to any tilt position desired.

The cylinder-piston means 12 generally comprise a cylinder 13 which telescopically receives the piston 14 having neither valves nor orifices extending therethrough. As shown in the drawings, the closed end of cylinder 13 of the cylinder-piston means 12 is pivotally connected to the transom bracket 7 rearwardly from and somewhat beneath the tilt pin 9 at 15. Oppositely, the rod 16 of piston 14 is pivotally connected to the swivel bracket 8 at 17. In the minimum trim position of power unit 4 with the swivel bracket 8 engaging with the transverse stop pin 18 carried by the lower portion of transom bracket 7, the cylinder-piston means 12 is disposed generally vertically and substantially fully extended.

As the power unit 4 along with the swivel bracket 8 moves upwardly about the tilt pin axis in a generally vertical plane either under power or by impact or manually, as will be more fully described hereinafter, the cylinder-piston means 12 progressively contract as the piston rod connection at 17 follows the arc 19 on a radius about the tilt pin axis. The cylinder-piston means 12 are fully contracted when the tilt movement upwardly of power unit 4 places the axis of the piston rod connection at 17 on the radial line 20 extending from the axis of tilt pin 9 through the axis of the cylinder connection at 15. Thus, at full contraction the cylinder-piston means 12 is disposed radially or on center with respect to the axis of tilt pin 9.

The cylinder-piston means 12 move over center and become again somewhat extended as the power unit 4 continues upwardly and approaches the maximum tilt position for the unit. In the maximum tilt position, movement of the power unit 4 is checked by the nylon restraining strap 21 the respective ends of which are anchored on the transverse rod 22 carried by the swivel bracket 8 and which is looped over the transverse rod 23 of the transom bracket 7. The restraining strap 21 is pulled taut over the rod 23 when power unit 4 reaches the maximum tilt position. The over center position of the cylinder-pis ton means 12 in the maximum tilt position of power unit 4 is represented by the line 24 as shown in FIGS. 2 and 3.

In the mounting arrangement of the cylinder-piston means 12, the lever arm of the means 12 relative to the tilt axis is maximum when the power unit 4 is in the minimum trim position. As the power unit 4 is raised or lifted about the tilt axis the lever arm of means 12 is constantly reducing in length and becomes nonexistent or zero when the power unit reaches the position placing the cylinder-piston means at the on center position represented by line 20.

When lifting the power unit 4 under power by the cylinder-piston means 12, the unit cannot reach the position placing the means 12 on line 20 but will attain a lesser position some few degrees short of line 20 because of power limitations and the small remaining lever arm. The maximum position of power unit 4 attainable under power by the cylinder-piston means 12, is generally shown by phantom lines in FIG. 1. It is further illustrated in FIG. 1 that when lifting power unit 4 from the minimum trim position to the maximum power tilt position, the center of gravity of the unit moves from position A generally to the rear of the tilt axis to position B generally above and only slightly to the rear of the tilt axis. From the maximum power tilt position of power unit 4 with the center of gravity more advantageously positioned at B, little manual effort is required to further lift the unit to its maximum tilt position moving the center of gravity over the tilt axis to its corresponding position C as the cylinder-piston means 12 move over center to their corresponding maximum position represented by line 24 in FIG. 2.

While this invention contemplates that a single cylinder-piston means 12 may be adequate and desirable for certain marine propulsion units, two such means 12 are provided on the outboard motor 1 as indicated in FIG. 3 of the drawings. The transversely spaced cylinder-piston means 12 disposed on opposite sides of outboard motor 1 are connected into the hydraulic system in such a manner that the means operate generally in unison and share substantially equally the loads imposed.

As shown in FIG. 3 the hydraulic system for operating the lift cylinder or cylinder-piston means 12 includes the gear pump 25 which is driven by the reversible electric motor 26. The pump 25 communicates with the opposed lines 27 and 28 which serve as pump inlet and outlet lines selectively in accordance with the direction of pump operation. Line 27 is the pressure or outlet side of pump 25 and line 28 the suction side when the cylinder-piston means 12 is being pumped up to contract the means and thereby lift the power unit 4. Line 28 on the other hand is the pressure or outlet side of pump 25 and line 27 the suction side when the cylinder-piston means 12 is being pumped down to extend the means and thereby lower the power unit 4.

The pump line 27 communicates respectively with the sump 29 through line 30 and the cylindrical shuttle piston chamber 31 through line 32. A check valve 33 having an upper closure seat 34 engageable by the loose ball 35 is disposed in line 30. Thus, when the pump 25 is operated to pump up to contract the cylinder-piston means 12 and lift the power unit 4, the ball 25 is caused to engage the seat 34 to close line 30 and so divert all of the pumped fluid through the line 32 toward the chamber 31. The maximum pump up pressure is established or set by the check and regulating valve 36 disposed in the line 37 connecting line 32 and the sump 29. When the pump 25 is idle or operating in the opposite direction, flow from the sump 29 through line 30 is freely permitted to prime and supply the pump.

Line 28 on the pump down side of pump 25 communicates respectively with sump 29 through the line 38 and the chamber 31 through the line 39 with the latter entering the opposite end of the chamber 31 from the line 32. A check valve 40 similar to valve 33 is disposed in line 38 and includes the loose ball 41 engageable with the upper closure seat 42. The ball 41 engages the seat 42 to close the line 38 in response to pump pressure when the pump 25 is operated to pump down, but is otherwise removed from its seat to permit fluid to flow from the sump 29 through line 38 to prime and supply the pump.

A double spool-like shuttle piston member 43 is disposed in the chamber 31 and moves back and forth therein in accordance with pump pressure. The effective piston portion 44 of member 43 is disposed intermediate the location of entry of the lines 32 and 39 and is longitudinally spaced from the respective end guide flanges 45. Intermediate the respective guide flanges 45 and the effective piston portion 44, the shuttle piston member 43 is recessed to provide for the flow of fluid around the member. The respective end guide flanges 45 are provided with peripheral recesses 46 to allow fluid under pressure to reach the corresponding end portions of chamber 31. The maximum pump down pressure is established or set by the check and regulating valve 47 disposed in the line 48 connecting the corresponding end of chamber 31 and the sump 29.

The end of chamber 31 oppositely from the line 48 opens into the line 49 which in turn communicates respectively with the line 50 extending to the sump 29 and the line 51 communicating with the cylinder-piston means 12. A check and regulating valve 52 is disposed in line 49 and is adapted to normally prevent fluid flow from the line 51 to the shuttle piston chamber 31, but the spring-biased bail 53 is forced from its seat 54 in response to a given pump up pressure developed by pump 25 to provide for flow in the opposite direction. The line 51 branches into two lines 55 and 56 which extend to the corresponding cylinders 13 (only one of which is shown) and communicate with the area behind the respective pistons 14 through the cylinder inlet ports 57.

To lift the power unit 4, pump 25 is operated to pump up and the pressure developed moves or retains the shuttle piston member 43 in chamber 31 to the right as viewed in FIG. 3. After a given pump up pressure is developed, the ball 53 of check valve 52 is unseated to open the line 49 and provide for flow through the line 51 and branch lines 55 and 56 to the cylinder portion behind the piston 14 whereby the cylinder-piston means 12 is contracted to effect the desired lift of power unit 4. When the power unit 4 has been lifted to the desired height and the pump 25 has been stopped, the piston 14 is hydraulically locked against extension of the cylinder-piston means 12 by closure of valve 52 in line 49 and by the safety relief valve 58 in line 50.

The safety relief valve 58 comprises a check and regulating valve wherein a piston member 59 is biased by the spring 60 in the direction of the pressure to be held. The seat 61 for valve 58 comprises a resilient washer which is compressed by the seated piston member 59 to force the washer into intimate sealing engagement with the forward projection 62 extending through the washer opening from member 59. Valve 58 is substantially leak proof and the biasing pressure of spring 60 must be adequate to hold against forward propeller thrust.

If the cylinder-piston means 12 is hydraulically locked against extension with the power unit 4 supported in a given lift position, it is necessary to relieve the pressure behind the piston 14 to lower the power unit. Such relief is provided by operation of the shuttle piston member 43 which carries a projection 63 adapted to enter the line 49 and unseat the ball 53 of valve 52. When the pump 25 is operated to pump down, it initially builds up a given back pressure in line 64 behind the combined regulating and check valve 65 to move the shuttle piston member 43 to the left as viewed in FIG. 3 to open the line 49. With the pressure behind piston 14 relieved, the power unit 4 will come down by gravity. A restricting orifice 66 in line 51 slows down the flow of escaping fluid from behind the piston 14 and thereby the downward travel of power unit 4 so that the unit will not uncontrollably outrun the pump 25 which is simultaneously forcing fluid through the line 64 past valve 65 and into cylinder 13 through the inlet port 67 disposed in the cylinder ahead of piston 14. As shown in FIG. 3, a line 68 places the line 64 in communication with the line 69 which is indicated to be connected to the forward portion of the second cylinder (not shown) which is similarly actuated.

When the power unit 4 has reached its new lower tilt position, the pump 25 is stopped to relieve the pressure on shuttle piston member 43 which during pump down maintained the line 49 open. With the removal of pump down pressure on shuttle piston member 43, the member is moved to the right as viewed in FIG. 3 within chamber 31 under the influence of the spring biased ball 53 in valve 52 which moves to reclose the line 49 and hydraulically relock the piston 14 against extension of the cylinder-piston means 12. With the stoppage of pump 25 the pressure in line 64 ahead of valve 65 is relieved permitting valve 65 to close and thereby substantially hydraulically lock piston 14 against contraction of the cylinder-piston means 12. If for any reason following closure of valve 65, the cylinder 13 ahead of piston 14 as well as the lines communicating therewith are not solidly filled with fluid, any additional amount so required for solid filling will be supplied from sump 29 under atmospheric pressure through the makeup and sump return line 70 which communicates with lines 68 and 69 through the line 71. The relatively low pressure check valve 72 in line 71 will pass fluid as required under atmospheric pressure for solid filling ahead of piston 14 but will prevent flow in the opposed direction.

With solid filling of the cylinder 13 and related lines ahead of piston 14, it will be necessary to provide flow relief from ahead of piston 14 during pump up to contract the cylinder-piston means 12 for lifting of the power unit 4. Such relief is provided for in the line 73 which places the respective lines ahead of piston 14 in communication with the sump return line 70 through the cylindrical chamber 74 containing a pilot release piston 75. Adjacent to chamber 74 the line 73 contains the check valve 76 wherein the ball 77 is biased in the direction of chamber 74 by the spring 78 against the seat 79. Thus, the valve 76 normally prevents flow from line 73 into chamber 74.

The pilot release piston 75 carries a pilot pin 80 which is adapted with piston movement to enter the line 73 and move the ball 77 from its seat 79 to thereby open line 73. The spring 81 normally biases the piston 75 out of contact with ball 77 and places the rod 82 on the opposite face of the piston in abutting relation with the opposed end wall of chamber 74. The pressure line 83 places the pump up end of the shuttle piston chamber 31 in communiaction with chamber 74 on the side of piston 75 oppositely from the pilot pin 80.

With the foregoing arrangement and with the pump 25 actuated to pump up to contract the cylinder-piston means 12, the regulating character of valve 52 in line 49 requires a given pressure to be built up before it will open to pass fluid. The biasing load of springs 81 and 78 on the pilot release piston 75 requires somewhat less pressure to move piston 75 to open valve 76 than is required to open valve 52. Thus, when the pump 25 is operated to pump up, the valve 76 in line 73 is opened to place the fluid in cylinder 13 ahead of piston 14 in communication with sump 29 through line 70 before the valve 52 in line 49 is opened. The fluid in cylinder 13 ahead of the piston 14 is then able to escape as the pump up fluid moves in behind piston 14 to contract the cylinder-piston means 12 to lift power unit 4. When the pump 25 is stopped, the resulting pressure drop will permit valve 52 in line 49 to close and the pilot release piston 75 will return to its normal position under the influence of spring 78 permitting valve 76 in line 73 to also close to again hydraulically lock the piston 14 relative to cylinder 13 against both extension and contraction.

The cylinder-piston means 12 also serves to damp the angular momentum of the power unit 4 when the unit strikes a submerged or floating object and as a result of the impact swings upwardly about the axis of tilt pin 9. As the unit 4 swings following such impact, the cylinder-piston means 12 contracts and therefore relief must be provided for the fluid ahead of piston 14. Such relief is provided by the check and regulating valve 84 in line 85 connecting the line 69 to the sump return line 70.

The valve 84 may be similar to valve 58 in line 50 and generally comprises the piston member 86 having a forwardly extending projection 87. The piston member 86 is biased by the spring 88 against its seat 89 adjacent to the line 69. The seat 89 for valve 84 comprises a resilient washer which on closure of the valve is compressed to force the washer into intimate substantially leak proof engagement with the piston projection 87 extending therethrough. The biasing pressure of spring 88 on the piston member 86 is necessarily relatively high and must be adequate to hold against reverse propeller thrust.

Upon impact of the power unit 4 with a submerged or floating object when underway in the forward direction, the fluid pressure ahead of piston 14 in cylinder-piston means 12 will rise rapidly as the cylinder-piston means is caused to contract by the swinging power unit. When the fluid pressure ahead of piston 14 exceeds the preset spring load on piston member 86 of valve 84, the valve will snap open to allow the fluid displaced by the inwardly moving piston to escape to sump 29 through lines 85 and 70. The preset spring load on the valve piston member 86 is determinative of the kinetic energy in the pivoting power unit 4 which is dissipated or absorbed and a substantial portion of that energy is removed as the cylinder-piston means 12 is pivoted up to the on center position and becomes fully contracted. Any energy remaining in the pivoting unit 4 will thereafter carry the cylinder-piston means 12 over center without further dissipation or absorption of energy, and if the unit 4 continues upwardly to the end of its swing, the swing will be checked by the restraining strap 21.

As the power unit 4 swings upwardly following impact, the quantity of fluid in the cylinder 13 behind the piston 14 remains unaffected. Therefore, when the power unit 4 swings back down, it will return to the same operating trim position held prior to the impact. As the power unit 4 returns to its operating trim position, fluid from sump 29 is forced under atmospheric pressure through the lines 70 and 71 past the makeup valve 72 to replace the fluid which had escaped from ahead of piston 14 to thereby hydraulically relock the cylinder-piston means 12 and hold unit 4 in the trim position.

If for any reason it is desired to manually pivot or tilt the power unit 4, there is provision therefor. A threaded member 90 is disposed in the valve block 91 in axial alignment with the rod 82 of the pilot release piston 75. If the member 90 is threaded inwardly it will engage the rod 82 and move the piston 75 axially causing the pilot pin 80 on the piston to unseat the ball 77 to open valve 76. With the valve 76 held open, fluid is free to flow from ahead of the piston 14 through the lines 73 and 70 to the sump 29 making manual tilting of the power unit 4 possible and relatively easy. As the member 90 is threaded outwardly to its original position, valve 76 is reclosed as the pilot pin 80 is withdrawn by influence of spring 81 on piston 75 to again render the cylinder-piston means 12 operative.

If when underway valve 76 in line 73 is open, as for example when trimming power unit 4 upwardly or if member 90 was overlooked and left in position for manual tilting, fluid then would be free to flow from ahead of piston 14. At such times there could be no damping of the angular momentum of power unit 4 in the event of an impact with a submerged or floating object unless other means are provided to prevent such flow. For this purpose the velocity check valve 92 is provided in line 73 immediately behind valve 76. Valve 92 includes the ball 93 which is normally supported off from its seat 94 adjacent to valve 76 by the opposed springs 78 and 95. With valve 76 open, the rapid flow of fluid through line 73 upon impact of power unit 4 with a submerged or floating object would force the ball 93 of valve 92 against its seat 94 to close line 73 and thereby render the valve 84 effective to provide for damping of the angular momentum of the swinging power unit.

FIGURE 4 shows an alternate form of cylinder-piston means 96 which may be interposed and connected between the clamp bracket 7 and swivel bracket 8 in a manner similar to cylinder-piston means 12 to bridge the tilt axis of the outboard motor 1. Cylinder-piston means 96 includes an annular floating piston 97 slidably disposed within the cylinder 98. The rod 99 extends into the cylinder 98 and is slidably disposed within the floating piston 97. The end of rod 99 inside the cylinder 98 is provided with a flanged abutment 100 for engaging with the adjacent face of floating piston 97. Cylinder-piston means 96 is connected into the hydraulic system in a manner similar to cylinder-piston means 12 with lines 55 and 64 respectively communicating with cylinder 98 on corresponding sides of the floating piston 97.

When the pump 25 is operated to pump up and fluid is introduced into cylinder 98 behind the floating piston 97 to contract the cylinder-piston means 96 and thereby lift power unit 4, the piston and rod move into the cylinder as a solid unit. With the restricting orifice 66 in line 51 to slow down the flow of escaping fluid from behind the piston 97 during pump down to lower power unit 4, the rod 99 and piston 97 generally also move together as a solid unit to extend the cylinder-piston means 96. However, upon impact of the power unit 4 with a submerged or floating object, the rod 99 and piston 97 separate with only the rod moving and displacing fluid to damp the angular momentum of the swinging power unit. With such an impact the floating piston 97 remains in place and with the return swing of the power unit 4 arrests the rod travel so that the power unit will resume the same operating trim position held prior to the impact.

The reversible motor 26 for operating the pump 25 is powered by the battery 101 as shown in FIG. 5. A control panel 102 for motor 26 is mounted at the dashboard 103 of watercraft 3 convenient to the operator and includes a key switch 104 and a rocker switch 105.

The rocker switch 105 is rendered effective to control motor 26 when the key switch 104 is actuated to close across contacts 106 and 107 disposed in series with switch 105 as generally shown in FIG. 5. With the key switch 104 closed across contacts 106 and 107, rocker switch 105 is selectively operable to close the parallel motor circuits for pumping up and pumping down operation of pump 25 as hereinafter described.

To lower power unit 4 from any position within the on center power lift range of the cylinder-piston means 12 to any desired lower or lesser position by extension of the cylinder-piston means with pump down operation of pump 25, the rocker switch 105 is actuated to close across contacts 108 and 109 completing the circuit through the pump down windings 110 of motor 26. The switch 105 is held closed across contacts 108 and 109 until the desired new lower or lesser position of power unit 4 is reached, following which the switch is released to stop motor 26 and pump down operation of pump 25. After switch 105 is released, it is biased to an inoperative position as shown in FIG. 5, by a spring, not shown. The rocker switch 105 may be used to lower power unit 4 even while the watercraft 3 is underway.

The circuit through the pump up windings 111 of motor 26 is completed by closure of switch 112 which is actuated by the solenoid 113 disposed in a parallel circuit from switch 112. The solenoid 113 may be energized to close switch 112 by the key switch 104, or under certain conditions by the rocker switch 105.

Actuation of key switch 104 for pump up is recommended only when the watercraft 3 is not underway or is proceeding slowly in shallow waters in the forward direction. With the key switch actuation for pump up, the power unit 4 may be lifted to any position within the on center power lift range of cylinder-piston means 12. To provide for lifting of power unit 4 by use of the key switch 104, the key switch is actuated to close across the contacts 106 and 114 by-passing the rocker switch 105 and completing the circuit through the solenoid 113. So long as the solenoid 113 remains energized by closure across key switch contacts 106 and 114, the pump up windings 111 of motor 26 remain energized to drive pump 25 to lift the power unit 4 to a desired new lift position by contraction of the cylinder-piston means 12. After the power unit 4 has been raised to the new lift position, the key for switch 104 is released and a spring, not shown, biases the switch to reclose across contacts 106 and 107 as generally shown in FIG. 5. With the key switch 104 closed across contacts 106 and 107, the rocker switch 105 is again rendered effective to lower power unit 4.

The rocker switch 105 is rendered effective for pump up only within a limited trimming range of power unit 4 and therefore can be used for trim adjustment of the power unit even while underway in the forward direction. For pump up operation, the rocker switch 105 is closed across contacts 108 and 115. The normally open trimming limit switch 116 connected in series with the rocker switch pump up contacts 108 and 115 controls the pump up trimming range for the rocker switch. The trimming limit switch 116 is mounted on the fixed transom bracket 7 and is held closed to render the rocker switch 105 effective for pump up trimming by a switch engaging plate member 117 carried by the movable cylinder 13 as shown in FIG. 2. The length of plate member 117 establishes the upward trimming range for power unit 4, and when the maximum upward trimming position of the power unit is reached the plate member disengages from the switch 116 which then assumes its normally open position to render the rocker switch 105 ineffective for further raising of the power unit.

Assuming closure of key switch 104 across contacts 106 and 107, and that the power unit 4 is disposed within the limited trimming range to maintain the trimming switch 116 closed, then closure across the rocker switch 108 and 115 will complete the circuit through solenoid 113 to close switch 112 to operate the pump 25 to pump up and thereby contract the cylinder-piston means 12 to lift the power unit to a new trim position. After the new trim position of power unit 4 is reached, the rocker switch 105 is released and biased to the inoperative position by a spring, not shown. If the new trim position of power unit 4 remains within the trimming range of rocker switch 105, then the rocker switch may be used for still further upward trimming or for downward trimming of the power unit as desired.

I claim:
1. In combination with an outboard propulsion unit for watercraft, said unit having a first support member secured to the watercraft, an intermediate support member pivotally mounted on the first support member about a first axis, and a drive member pivotally mounted on the intermediate support member about a second axis generally normal to the first axis and having a propeller adapted to provide forward and reverse thrust for the watercraft, one of said axes being generally vertical to provide for steering movement of the drive member in a generally horizontal plane and the other of said axes being transverse horizontal to provide for tilt movement of the drive member in a generally vertical plane; a hydraulic system providing for power tilt of the drive member about the tilt axis and including a cylinder-piston assembly connecting the intermediate support member and one of the other of said members and bridging the transverse horizontal tilt axis, a source of fluid, pump means communicating with said fluid source, reversible drive means for selectively driving the pump means in opposed directions corresponding to pump up and pump down operation respectively, pump up line means placing the pump means and fluid source in communication with the cylinder portion on the pump up side of the piston, pump down line means placing the pump means and fluid source in communication with the cylinder portion on the pump down side of the piston, valve means in the respective line means to hydraulically lock the cylinder-piston assembly in a selected condition of extension or contraction, said valve means in the pump up line means being adapted to hold as against forward propeller thrust and to open in response to a given pump up pressure to provide for fluid flow to the cylinder-piston assembly, said valve means in the pump down line means being adaped to hold as against reverse propeller thrust and to open in response to a given pump down pressure to provide for fluid flow to the cylinder-piston assembly, means operable in response to pump up pressure to open the valve means in the pump down line means to provide for escape of fluid from the cylinder portion on the pump down side of the piston when the pump means is operated to pump up and thereby lift the drive member, and means operable in response to pump down pressure to open the valve means in the pump up line means to provide for escape of fluid from the cylinder portion on the pump up side of the piston when the pump means is operated to pump down and thereby provide for lowering of the drive member, said valve means in the pump down line means being operative to open in response to a given pressure to provide for escape of fluid from the cylinder portion on the pump down side of the piston to damp the angular momentum of the upwardly tilting drive member following an impact with a submerged or floating object.

2. The invention as set forth in claim 1 wherein the means operable in response to pump down to open the valve means in the pump up line means comprises piston means.

3. The invention as set forth in claim 1 wherein the pump down line means includes a fluid source return line means which places the cylinder portion on the pump down side of the piston in communication with the fluid source, and wherein the valve means in the pump down line means includes a check valve disposed in said fluid source return line means to prevent fluid flow from the cylinder to the fluid source, and wherein the means operable in response to pump up pressure to provide for escape of fluid from the cylinder portion on the pump down side of the piston comprises piston means movable in response to pump up pressure to open said check valve.

4. The invention as set forth in claim 3 wherein manually operable means are provided for moving he piston means to open the check valve in the fluid source return line means to provide for escape of fluid from the cylinder portion on the pump down side of the piston to thereby provide for manual tilting of the drive member.

5. The invention as set forth in claim 3 wherein the valve means includes a regulating valve disposed in the fluid source return line means, said regulating valve being adapted to hold as against reverse propeller thrust and to open in response to a given pressure to provide for escape of fluid from the cylinder portion on the pump down side of the piston to damp the angular momentum of the upwardly tilting drive member following an impact with a submerged or floating object.

6. The invention as set forth in claim 1 wherein the pump up line means includes a line placing the cylinder portion on the pump up side of the piston in communication with the fluid source, and wherein the valve means in the pump up line means includes a regulating valve disposed in the line placing the cylinder portion on the pump up side of the piston in communication with the fluid source, said regulating valve being adapted to hold as against forward propeller thrust of the drive member.

7. The invention as set forth in claim 1 wherein the propulsion unit drive member is pivotable on said tilt axis through a limited angle for trim adjustment and wherein the reversible drive means for selectively driving the pump in opposed directions comprises an electric motor, switch means adapted to control the motor including a normally open limit switch, a trim adjustment switch disposed in series with said limit switch, said limit switch being disposed on the nontilting propulsion unit member containing the tilt axis and being engageable by the tiltable propulsion unit member, said tiltable propulsion unit member holding the limit switch closed through the limited angle for trim adjustment to render the trim adjustment switch effective for upward trimming of the drive member and disengaging the limit switch beyond said limited angle whereby the limit switch assumes its normally open position to render the trim adjustment switch ineffective for further upward trimming of the drive member.

8. The invention as set forth in claim 5 wherein a velocity check valve is disposed in series with and behind the check valve in said fluid source return line means, said velocity check valve being adapted to close the fluid source return line means in response to rapid flow of fluid from the cylinder following an impact of the drive member with a submerged or floating object to thereby render the regulating valve effective to damp the angular momentum of the upwardly tilting drive member in the event the check valve in said fluid source return line means is held open by the manually operable means.

9. In a hydraulic system for use in an outboard propulsion unit having a transverse horizontal tilt axis about which a drive member is adapted to pivot in a generally vertical plane, said hydraulic system being adapted to selectively lift the drive member and comprising a cylinder-piston assembly adapted for connection to the adjacent members of the propulsion unit joined for relative pivotal movement at the tilt axis whereby said assembly bridges said axis, said cylinder-piston assembly connection providing for substantially full extension of the assembly in the normal operating position of the drive member and contraction with upward tilt movement of said member, a source of fluid, a pump communicating with said fluid source, reversible drive means for selectively driving the pump in opposed directions to pump up and pump down respectively, pump up line means placing the pump in communication with the cylinder portion behind the piston, pump down line means placing the pump in communication with the cylinder portion ahead of the piston, valve means in the pump up line means to hydraulically lock the cylinder-piston assembly against extension and adapted to open in response to a given pump up pressure to provide for fluid passage to the cylinder portion behind the piston to contract the cylinder-piston assembly and thereby lift the drive member, valve means in the pump down line means to hydraulically lock the cylinder-piston assembly against contraction and adapted to open in response to a given pump down pressure to provide for fluid passage to the cylinder portion ahead of the piston to extend the cylinder-piston assembly and thereby lower the drive member, means operable in response to pump up pressure to provide for escape of fluid from the cylinder portion ahead of the piston when the pump is operated to pump up and thereby lift the drive member, and means operable in response to pump down pressure to provide for escape of fluid from the cylinder portion behind the piston when the pump is operated to pump down and thereby lower the drive member, said valve means in the pump down line means being operative to open in response to a given pressure to provide for escape of the fluid from the cylinder portion ahead of the piston to damp the angular momentum of the upwardly tilting drive member following an impact with a submerged or floating object.

10. In combination with an outboard propulsion unit for watercraft, said unit having a first support member secured to the watercraft, an intermediate support member pivotally mounted on the first support member about a first axis, and a drive member pivotally mounted on the intermediate support member about a second axis generally normal to the first axis, one of said axes being generally vertical to provide for steering movement of the drive member in a generally horizontal plane and the other of said axes being transverse horizontal to provide for tilt movement of the drive member in a generally vertical plane; cylinder-piston means connecting the intermediate support member and one of the other of said members and bridging the transverse horizontal tilt axis, said cylinder-piston means having a fixed pivotal axis generally rearwardly of the tilt axis and being substantially fully extended and disposed generally vertically in the normal operating position of the drive member and contracting with upward tilt movement of the drive member to damp the angular momentum of the upwardly tilting drive member following an impact with a submerged or floating object and to selectively lift the drive member, and means to check the upward tilt movement of the drive member after the cylinder-piston means have exceeded their effective lift range and moved over center with respect to the line extending through the tilt axis and the fixed pivotal axis of said cylinder-piston means.

11. The invention as set forth in claim 10 wherein the means to check the upward tilt movement of the drive member comprises a flexible strap which bridges the tilt axis and is pulled taut when said drive member reaches the maximum tilt position.

References Cited

UNITED STATES PATENTS

| | | | |
|---|---|---|---|
| 2,328,979 | 9/1943 | Herman et al. | 91—420 |
| 2,696,196 | 12/1954 | Adams et al. | 91—451 X |
| 2,755,766 | 7/1956 | Wanzer | 115—35 |
| 2,928,631 | 3/1960 | Hartman | 115—41 X |
| 3,164,959 | 1/1965 | Gondek | 91—420 |
| 3,260,165 | 7/1966 | Larsen et al. | 91—420 X |
| 3,274,902 | 9/1966 | Kleckner | 91—420 |
| 3,285,221 | 11/1966 | North | 115—41 |

TRYGVE M. BLIX, *Primary Examiner.*

U.S. Cl. X.R.

91—420